United States Patent
Li et al.

(10) Patent No.: US 10,231,166 B2
(45) Date of Patent: Mar. 12, 2019

(54) RESOURCE ACCESS PRIORITY FOR SYNCHRONOUS TRANSMISSIONS

(71) Applicant: QUALCOMM Incorporated, San Diego, CA (US)

(72) Inventors: Chong Li, Weehawken, NJ (US); Piyush Gupta, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 15/249,229

(22) Filed: Aug. 26, 2016

(65) Prior Publication Data

US 2017/0311225 A1    Oct. 26, 2017

Related U.S. Application Data

(60) Provisional application No. 62/325,221, filed on Apr. 20, 2016.

(51) Int. Cl.
*H04W 40/24* (2009.01)
*H04L 5/00* (2006.01)
(Continued)

(52) U.S. Cl.
CPC ......... *H04W 40/246* (2013.01); *H04L 5/0048* (2013.01); *H04W 8/005* (2013.01);
(Continued)

(58) Field of Classification Search
CPC .................................................. H04W 40/246
(Continued)

(56) References Cited

U.S. PATENT DOCUMENTS

2014/0321377 A1* 10/2014 Ryu ................. H04W 72/1247
                                                       370/329
2016/0278120 A1*  9/2016 Ro .......................... H04L 67/10

FOREIGN PATENT DOCUMENTS

EP        3068061 A1   9/2016
KR     20150053686 A   5/2015

OTHER PUBLICATIONS

Interdigital: "D2D Discovery in LTE", 3GPP TSG-RAN WG1 Meeting #73, R1-132187, May 11, 2013, XP050697959, Retrieved from the Internet: URL:http://www.3gpp.org/ftp/tsg_ran/WG1_RL1/TSGR1_73/Docs/, 6 pages.

(Continued)

*Primary Examiner* — Peter G Solinsky
(74) *Attorney, Agent, or Firm* — Loza & Loza, LLP

(57) ABSTRACT

A user equipment (UE) may determine that a synchronous transmission by the UE includes traffic having a priority higher than a priority of nominal traffic. In response to the determination, the UE may alter a use of at least some of an initial portion of a discovery frame from energy detection to signal transmission. The signal transmission may be a pilot signal transmission or a non-information-carrying signal transmission. The traffic having the priority higher than the nominal traffic may include mission-critical traffic. A reliability requirement of mission-critical traffic may be higher than a reliability requirement of nominal traffic. A latency requirement of mission-critical traffic may be lower than a latency requirement of nominal traffic. The signal transmission may be at a power level that is sufficient to result in energy detection at another UE. Various additional and alternative aspects are described herein.

30 Claims, 11 Drawing Sheets

(51) Int. Cl.
*H04W 72/00* (2009.01)
*H04W 72/10* (2009.01)
*H04W 8/00* (2009.01)
*H04W 74/08* (2009.01)

(52) U.S. Cl.
CPC ......... *H04W 72/005* (2013.01); *H04W 72/10* (2013.01); *H04W 74/0816* (2013.01); *H04W 74/0833* (2013.01)

(58) Field of Classification Search
USPC ....................................................... 370/329
See application file for complete search history.

(56) References Cited

OTHER PUBLICATIONS

International Search Report and Written Opinion—PCT/US2017/026658—ISA/EPO—dated Jul. 12, 2017.
ZTE: "Discussion of D2D Discovery", 3GPP Draft; R1-133149 D2D Discovery, 3rd Generation Partnership Project (3GPP), Mobile Competence Centre; 650, Route Des Lucioles; F-06921 Sophia-Antipolis Cedex; France, vol. RAN WG1, No. Barcelona, Spain; Aug. 19, 2013-Aug. 23, 2013, Aug. 10, 2013 (Aug. 10, 2013), XP050716361, Retrieved from the Internet:URL:http://www.3gpp.org/ftp/tsg_ran/WG1_RL1/TSGR1_74/Docs/ [retrieved on Aug. 10, 2013].

\* cited by examiner

RESOURCE ACCESS PRIORITY FOR SYNCHRONOUS TRANSMISSIONS

PRIORITY CLAIM

This application claims priority to and the benefit of provisional patent application No. 62/325,221 filed in the United States Patent and Trademark Office on Apr. 20, 2016, the entire content of which is incorporated herein by reference as if fully set forth below in its entirety and for all applicable purposes.

TECHNICAL FIELD

The technology discussed herein relates, generally, to wireless communication systems, and, more particularly, to resource access priority for synchronous transmissions.

INTRODUCTION

Wireless communication networks are widely deployed to provide various communication services such as telephony, video, data, messaging, broadcasts, and so on. Such networks, which are usually multiple access networks, support communication for multiple users by sharing the available network resources. Within such wireless networks a variety of data services may be provided, including voice, video, and emails. The spectrum allocated to such wireless communication networks can include licensed spectrum and/or unlicensed spectrum. As the demand for mobile broadband access continues to increase, research and development continue to advance wireless communication technologies not only to meet the growing demand for mobile broadband access, but also to advance and enhance the user experience with mobile communications. In some circumstances, synchronous transmissions may be performed without the aid of explicit feedback mechanisms that enable prioritized access to radio resources for varying types of traffic. Accordingly, relatively high-priority traffic may sometimes contend or collide with relatively low-priority traffic while attempting to access the same radio resource.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a method of wireless communication by a user equipment (UE). The method may include determining that a synchronous transmission by the UE includes traffic having a priority higher than a priority of nominal traffic. In response to the determination, the UE may alter a use of at least some of an initial portion of a discovery frame from energy detection to signal transmission.

In some aspects, the present disclosure also provides an apparatus for wireless communication that includes a processor, a transceiver communicatively coupled to the at least one processor, and a memory communicatively coupled to the at least one processor. The processor may be configured to determine that a synchronous transmission by the apparatus includes traffic having a priority higher than a priority of nominal traffic. The processor may be further configured to, in response to the determination, alter a use of at least some of an initial portion of a discovery frame from energy detection to signal transmission.

In some aspects, the present disclosure also provides a non-transitory computer-readable medium storing computer-executable code comprising instructions. The instructions may be configured to determine that a synchronous transmission includes traffic having a priority higher than a priority of nominal traffic. The instructions may be further configured to, in response to the determination, alter a use of at least some of an initial portion of a discovery frame from energy detection to signal transmission.

In some aspects, the present disclosure also provides another apparatus for wireless communication. The apparatus may include a means for determining that a synchronous transmission by the apparatus includes traffic having a priority higher than a priority of nominal traffic. The apparatus may also include a means for altering, in response to the determination, a use of at least some of an initial portion of a discovery frame from energy detection to signal transmission.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
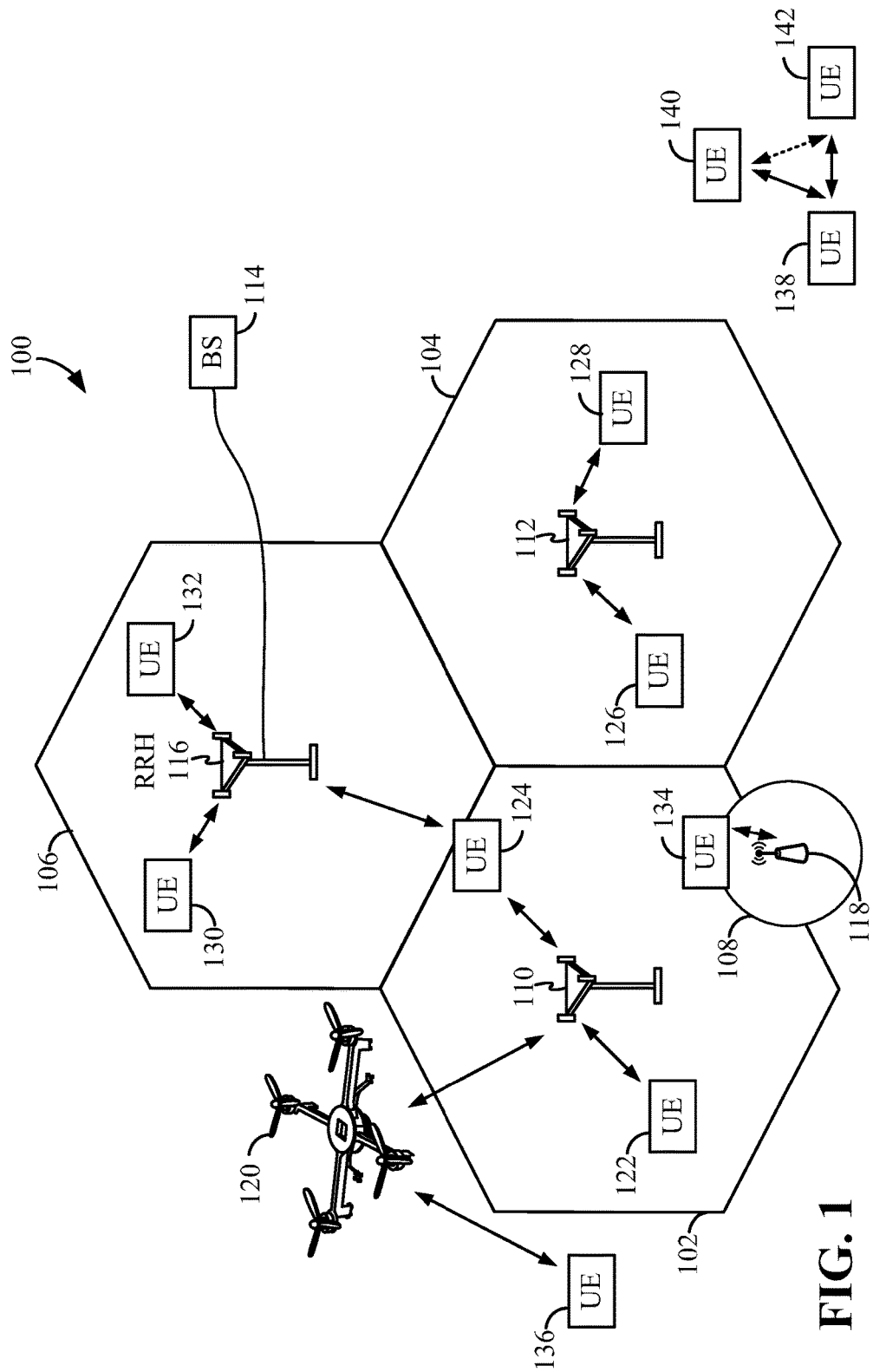
FIG. 1 is a diagram illustrating an example of an access network according to some aspects of the present disclosure.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120. In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (TDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P) network, and/or in a mesh network. In a mesh network example, UEs 140 and 142 may optionally communicate directly with one another in addition to communicating with the scheduling entity 138.

Figure 2:
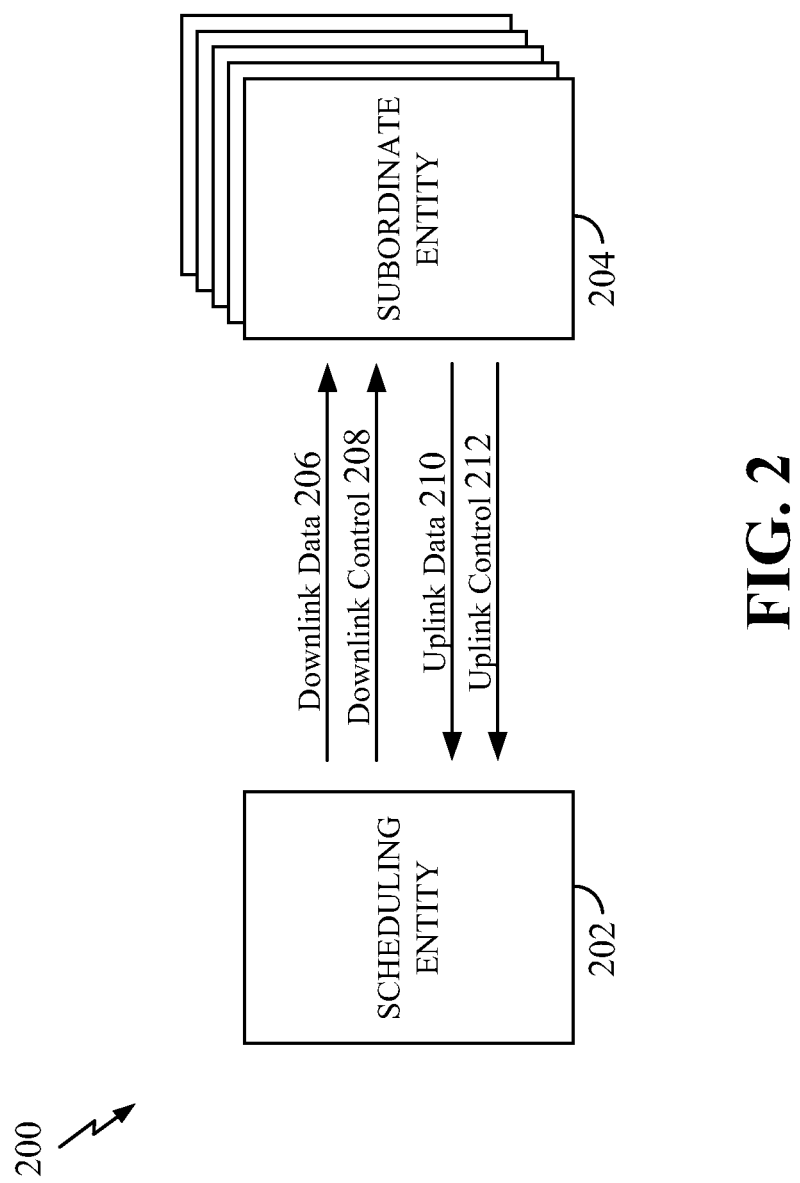
FIG. 2 is a diagram conceptually illustrating an example of a scheduling entity communicating with one or more subordinate entities (e.g., user equipments (UEs)) according to some aspects of the present disclosure.

Thus, in a wireless communication network with a scheduled access to time-frequency resources and having a cellular configuration, a P2P configuration, and a mesh configuration, a scheduling entity and one or more subordinate entities may communicate utilizing the scheduled resources. Referring now to FIG. 2, a block diagram illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the subordinate entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, or other suitable groupings of bits for transmission.

Furthermore, the subordinate entities 204 may transmit uplink control information 212 to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc. The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

Figure 3:
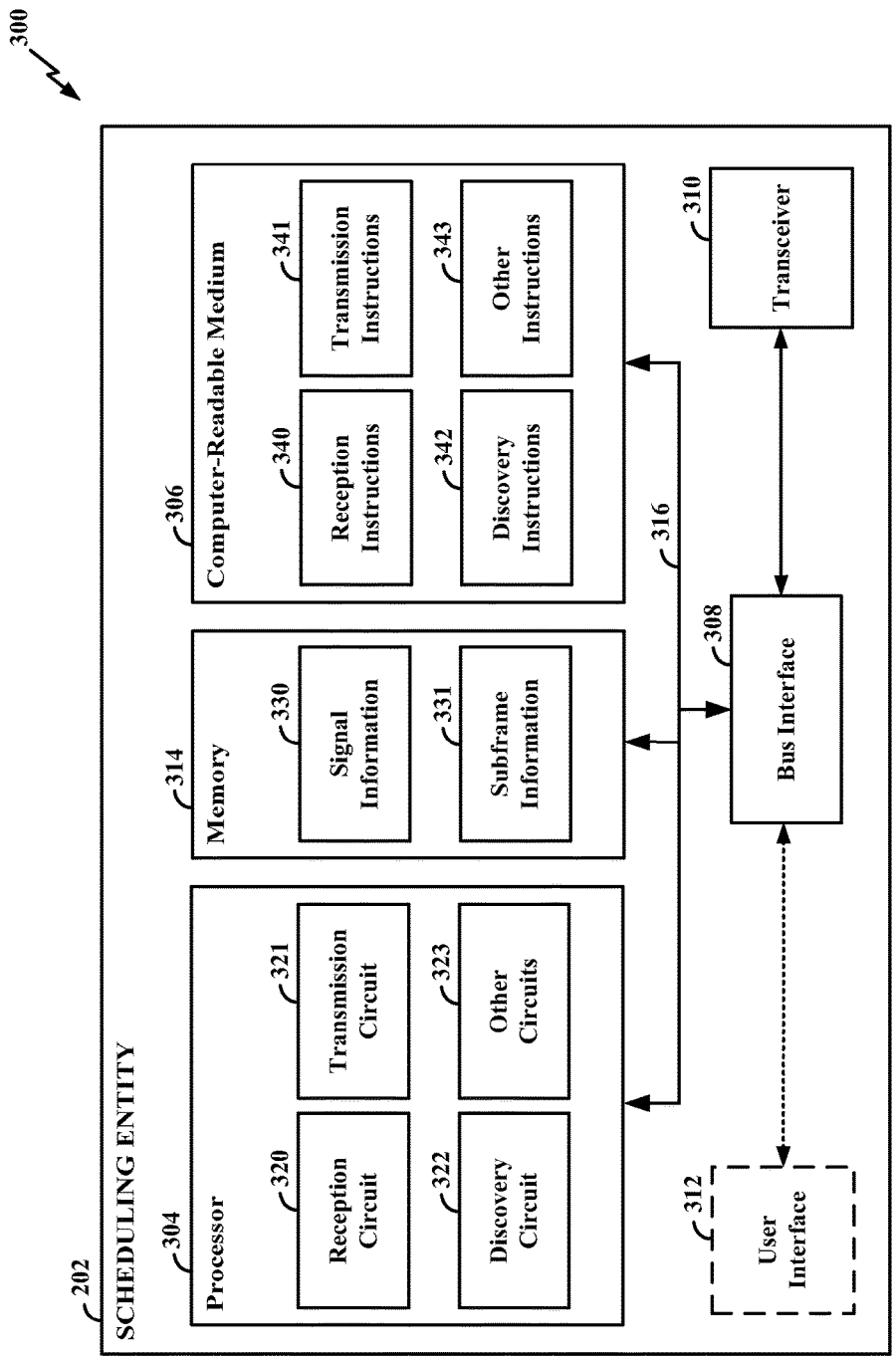
FIG. 3 is a diagram illustrating an example of a hardware implementation for a scheduling entity according to some aspects of the present disclosure.

FIG. 3 is a diagram 300 illustrating an example of a hardware implementation of the scheduling entity 202 according to various aspects of the present disclosure. The scheduling entity 202 may include a user interface 312. The user interface 312 may be configured to receive one or more inputs from a user of the scheduling entity 202. In some configurations, the user interface 312 may be a keypad, a display, a speaker, a microphone, a joystick, and/or any other suitable component of the scheduling entity 202. The user interface 312 may exchange data via the bus interface 308. The scheduling entity 202 may also include a transceiver 310. The transceiver 310 may be configured to receive data and/or transmit data in communication with another apparatus. The transceiver 310 provides a means for communicating with another apparatus via a wired or wireless transmission medium. The transceiver 310 may be configured to perform such communications using various types of technologies without deviating from the scope of the present disclosure.

The scheduling entity 202 may also include a memory 314, one or more processors 304, a computer-readable medium 306, and a bus interface 308. The bus interface 308 may provide an interface between a bus 316 and the transceiver 310. The memory 314, the one or more processors 304, the computer-readable medium 306, and the bus interface 308 may be connected together via the bus 316. The processor 304 may be communicatively coupled to the transceiver 310 and/or the memory 314.

The processor 304 may include a reception circuit 320. In some configurations, the reception circuit 320 may include hardware components and/or may perform various algorithms that provide the means for utilizing the transceiver 310 to receive a signal. The processor 304 may also include a transmission circuit 321. The transmission circuit 321 may provide the means for utilizing the transceiver 310 to transmit a signal. The processor 304 may also include a discovery circuit 322. The discovery circuit 322 may include various hardware components and/or may perform various algorithms that provide the means for accommodating various discovery protocols and procedures described in greater detail herein. The foregoing description provides a non-limiting example of the processor 304 of the scheduling entity 202. Although various circuits 320, 321, 322 are described above, one of ordinary skill in the art will understand that the processor 304 may also include various other circuits 323 that are in addition and/or alternative(s) to the aforementioned circuits 320, 321, 322. Such other circuits 323 may provide the means for performing any one or more of the functions, methods, processes, features and/or aspects described herein.

The computer-readable medium 306 may include various computer-executable instructions. The computer-executable instructions may include computer-executable code configured to perform various functions and/or enable various aspects described herein. The computer-executable instructions may be executed by various hardware components (e.g., the processor 304 and/or any of its circuits 320, 321, 322, 323) of the scheduling entity 202. The computer-executable instructions may be a part of various software programs and/or software modules. The computer-readable medium 306 may include reception instructions 340, may include computer-executable instructions configured for receiving a signal. The computer-readable medium 306 may also include transmission instructions 341, which may include computer-executable instructions configured for transmitting a signal. The computer-readable medium 306 may also include discovery instructions 342, which may include computer-executable instructions configured for accommodating various discovery protocols and procedures described in greater detail herein. The foregoing description provides a non-limiting example of the computer-readable medium 306 of the scheduling entity 202. Although various computer-executable instructions 340, 341, 342 are described above, one of ordinary skill in the art will understand that the computer-readable medium 306 may also include various other computer-executable instructions 343 that are in addition and/or alternative(s) to the aforementioned computer-executable instructions 340, 341, 342. Such other computer-executable instructions 343 may be configured for any one or more of the functions, methods, processes, features and/or aspects described herein.

The memory 314 may include various memory modules. The memory modules may be configured to store, and have read therefrom, various values and/or information by the processor 304, or any of its circuits 320, 321, 322, 323. The memory modules may also be configured to store, and have read therefrom, various values and/or information upon execution of the computer-executable code included in the computer-readable medium 306, or any of its instructions 340, 341, 342, 343. The memory 314 may include signal information 330. The signal information 330 may include various types, quantities, configurations, arrangements, and/or forms of information related to a transmitted/received signal. The memory 314 may also include subframe information 331. The subframe information 331 may include various types, quantities, configurations, arrangements, and/or forms of information related to any subframe described in greater detail herein. In some examples, the subframe may be a discovery subframe, as described in greater detail herein. The foregoing description provides a non-limiting example of the memory 314 of the scheduling entity 202. Although various types of data of the memory 314 are described above, one of ordinary skill in the art will understand that the memory 314 may also include various other data that are in addition and/or alternative(s) to the aforementioned information 330, 331. Such other data may be associated with any one or more of the functions, methods, processes, features and/or aspects described herein.

One of ordinary skill in the art will also understand that the scheduling entity 202 may include alternative and/or additional features without deviating from the scope of the present disclosure. In accordance with various aspects of the present disclosure, an element, or any portion of an element, or any combination of elements may be implemented with a processing system that includes one or more processors 304. Examples of the one or more processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing system may be implemented with a bus architecture, represented generally by the bus 316 and bus interface 308. The bus 316 may include any number of interconnecting buses and bridges depending on the specific application of the processing system and the overall design constraints. The bus 316 may link together various circuits including the one or more processors 304, the memory 314, and the computer-readable medium 306. The bus 316 may also link various other circuits such as timing sources, peripherals, voltage regulators, and power management circuits.

The one or more processors 304 may be responsible for managing the bus 316 and general processing, including the execution of software stored on the computer-readable medium 306. The software, when executed by the one or more processors 304, causes the processing system to perform the various functions described below for any one or more apparatuses. The computer-readable medium 306 may also be used for storing data that is manipulated by the one or more processors 304 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 306.

The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 306 may also include, by way of example, a carrier wave, a transmission line, and any other suitable medium for transmitting software and/or instructions that may be accessed and read by a computer. The computer-readable medium 306 may reside in the processing system, external to the processing system, or distributed across multiple entities including the processing system. The computer-readable medium 306 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 4:
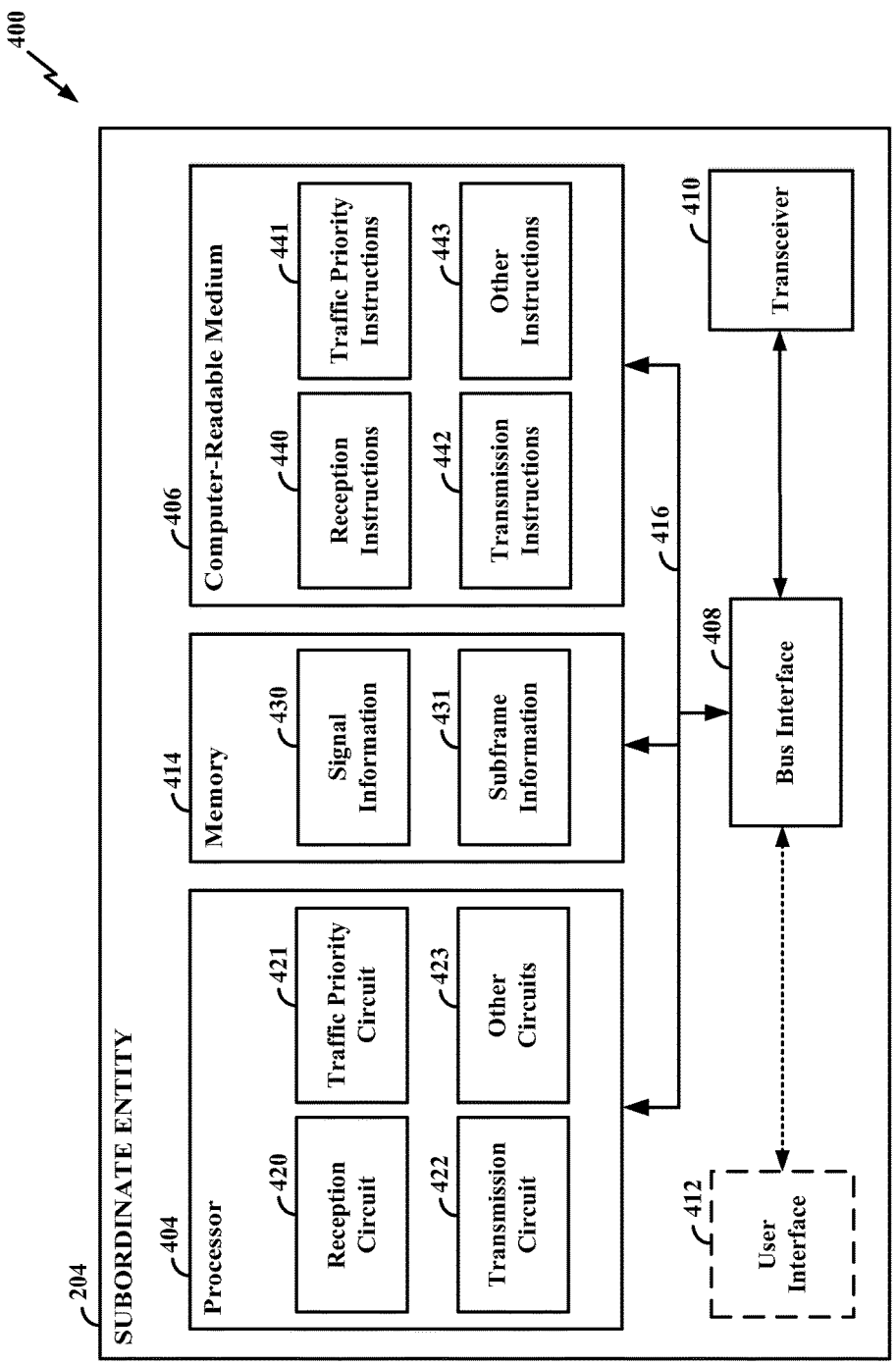
FIG. 4 is a diagram illustrating an example of a hardware implementation for a subordinate entity (e.g., UE) according to some aspects of the present disclosure.

FIG. 4 is a diagram 400 illustrating an example of a hardware implementation of the subordinate entity 204 according to various aspects of the present disclosure. The subordinate entity 204 may include a user interface 412. The user interface 412 may be configured to receive one or more inputs from a user of the subordinate entity 204. In some configurations, the user interface 412 may be a keypad, a display, a speaker, a microphone, a joystick, and/or any other suitable component of the subordinate entity 204. The user interface 412 may exchange data via the bus interface 408. The subordinate entity 204 may also include a transceiver 410. The transceiver 410 may be configured to receive data and/or transmit data in communication with another apparatus. The transceiver 410 provides a means for communicating with another apparatus via a wired or wireless transmission medium. The transceiver 410 may be configured to perform such communications using various types of technologies without deviating from the scope of the present disclosure.

The subordinate entity 204 may also include a memory 414, one or more processors 404, a computer-readable medium 406, and a bus interface 408. The bus interface 408 may provide an interface between a bus 416 and the transceiver 410. The memory 414, the one or more processors 404, the computer-readable medium 406, and the bus interface 408 may be connected together via the bus 416. The processor 404 may be communicatively coupled to the transceiver 410 and/or the memory 414.

The processor 404 may include a reception circuit 420. In some configurations, the reception circuit 420 may include hardware components and/or may perform various algorithms that provide the means for utilizing the transceiver 410 to receive a signal. In some examples, the received signal is a synchronous transmission (e.g., synchronous broadcast transmission, a synchronous multicast transmission, etc.). In some examples, the synchronous transmission may include traffic having a priority higher than a priority of nominal traffic. The processor 404 may also include a traffic priority circuit 421. The traffic priority circuit 421 may provide the means for determining that a synchronous transmission includes traffic having a priority higher than a priority of nominal traffic. In some examples, the traffic is mission-critical traffic.

The processor 404 may also include a transmission circuit 422. The transmission circuit 422 may include various hardware components and/or may perform various algorithms that provide the means for altering, in response to the determination, a use of at least some of an initial portion of a discovery frame from energy detection to signal transmission. In some configurations, the transmission circuit 422 may include various hardware components and/or may perform various algorithms that further provide the means for selecting a random number of backoff symbols and altering the use of the initial portion of the discovery frame after the random number of backoff symbols. In some examples, the initial portion of the discovery frame includes the first symbol of the discovery frame. In some examples, the number of backoff symbols is fewer than a number of symbols in the initial portion of the discovery frame. In some examples, the transmitted signal is a pilot signal. In some examples, the transmitted signal is a non-information-carrying signal. In some examples, the transmitted signal is at a power level sufficient to result in energy detection at another UE. The foregoing description provides a non-limiting example of the processor 404 of the subordinate entity 204. Although various circuits 420, 421, 422 are described above, one of ordinary skill in the art will understand that the processor 404 may also include various other circuits 423 that are in addition and/or alternative(s) to the aforementioned circuits 420, 421, 422. Such other circuits 423 may provide the means for performing any one or more of the functions, methods, processes, features and/or aspects described herein.

The computer-readable medium 406 may include various computer-executable instructions. The computer-executable instructions may include computer-executable code configured to perform various functions and/or enable various aspects described herein. The computer-executable instructions may be executed by various hardware components (e.g., the processor 404 and/or any of its circuits 420, 421, 422, 423) of the subordinate entity 204. The computer-executable instructions may be a part of various software programs and/or software modules.

The computer-readable medium 406 may include reception instructions 440. In some configurations, the reception instructions 440 may include computer-executable instructions configured for receiving a signal. In some examples, the received signal is a synchronous transmission (e.g., synchronous broadcast transmission, a synchronous multicast transmission, etc.). In some examples, the synchronous transmission may include traffic having a priority higher than a priority of nominal traffic. The computer-readable medium 406 may also include traffic priority instructions 441. The traffic priority instructions 441 may include computer-executable instructions configured for determining that a synchronous transmission includes traffic having a priority higher than a priority of nominal traffic. In some examples, the traffic is mission-critical traffic.

The computer-readable medium 406 may also include transmission instructions 442. The transmission instructions 442 may include computer-executable instructions configured for altering, in response to the determination, a use of at least some of an initial portion of a discovery frame from energy detection to signal transmission. In some configurations, the transmission instructions 442 may include computer-executable instructions configured for selecting a random number of backoff symbols and altering the use of the initial portion of the discovery frame after the random number of backoff symbols. In some examples, the initial portion of the discovery frame includes the first symbol of the discovery frame. In some examples, the number of backoff symbols is fewer than a number of symbols in the initial portion of the discovery frame. In some examples, the transmitted signal is a pilot signal. In some examples, the transmitted signal is a non-information-carrying signal. In some examples, the transmitted signal is at a power level sufficient to result in energy detection at another UE. The foregoing description provides a non-limiting example of the computer-readable medium 406 of the subordinate entity 204. Although various computer-executable instructions 440, 441, 442 are described above, one of ordinary skill in the art will understand that the computer-readable medium 406 may also include various other computer-executable instructions 443 that are in addition and/or alternative(s) to the aforementioned computer-executable instructions 440, 441, 442. Such other computer-executable instructions 443 may be configured for any one or more of the functions, methods, processes, features and/or aspects described herein.

The memory 414 may include various memory modules. The memory modules may be configured to store, and have read therefrom, various values and/or information by the processor 404, or any of its circuits 420, 421, 422, 423. The memory modules may also be configured to store, and have read therefrom, various values and/or information upon execution of the computer-executable code included in the computer-readable medium 406, or any of its instructions 440, 441, 442, 443. The memory 414 may include signal information 430. The signal information 430 may include various types, quantities, configurations, arrangements, and/or forms of information related to the transmitted signal, as described in greater detail above and elsewhere herein. The memory 414 may also include subframe information 431. The subframe information 431 may include various types, quantities, configurations, arrangements, and/or forms of information related to any subframe described in greater detail herein. In some examples, the subframe may be a discovery subframe, as described in greater detail herein. The foregoing description provides a non-limiting example of the memory 414 of the scheduling entity 202. Although various types of data of the memory 414 are described above, one of ordinary skill in the art will understand that the memory 414 may also include various other data that are in addition and/or alternative(s) to the aforementioned information 430, 431. Such other data may be associated with any one or more of the functions, methods, processes, features and/or aspects described herein.

One of ordinary skill in the art will also understand that the subordinate entity 204 may include alternative and/or additional features without deviating from the scope of the present disclosure. In accordance with various aspects of the present disclosure, an element, or any portion of an element, or any combination of elements may be implemented with a processing system that includes one or more processors 404. Examples of the one or more processors 404 include microprocessors, microcontrollers, DSPs, FPGAs, PLDs, state machines, gated logic, discrete hardware circuits, and other suitable hardware configured to perform the various functionality described throughout this disclosure. The processing system may be implemented with a bus architecture, represented generally by the bus 416 and bus interface 408.

The bus 416 may include any number of interconnecting buses and bridges depending on the specific application of the processing system and the overall design constraints. The bus 416 may link together various circuits including the one or more processors 404, the memory 414, and the computer-readable medium 406. The bus 416 may also link various other circuits such as timing sources, peripherals, voltage regulators, and power management circuits.

The one or more processors 404 may be responsible for managing the bus 416 and general processing, including the execution of software stored on the computer-readable medium 406. The software, when executed by the one or more processors 404, causes the processing system to perform the various functions described below for any one or more apparatuses. The computer-readable medium 406 may also be used for storing data that is manipulated by the one or more processors 404 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 406.

The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium 406 may also include, by way of example, a carrier wave, a transmission line, and any other suitable medium for transmitting software and/or instructions that may be accessed and read by a computer. The computer-readable medium 406 may reside in the processing system, external to the processing system, or distributed across multiple entities including the processing system. The computer-readable medium 406 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 5:
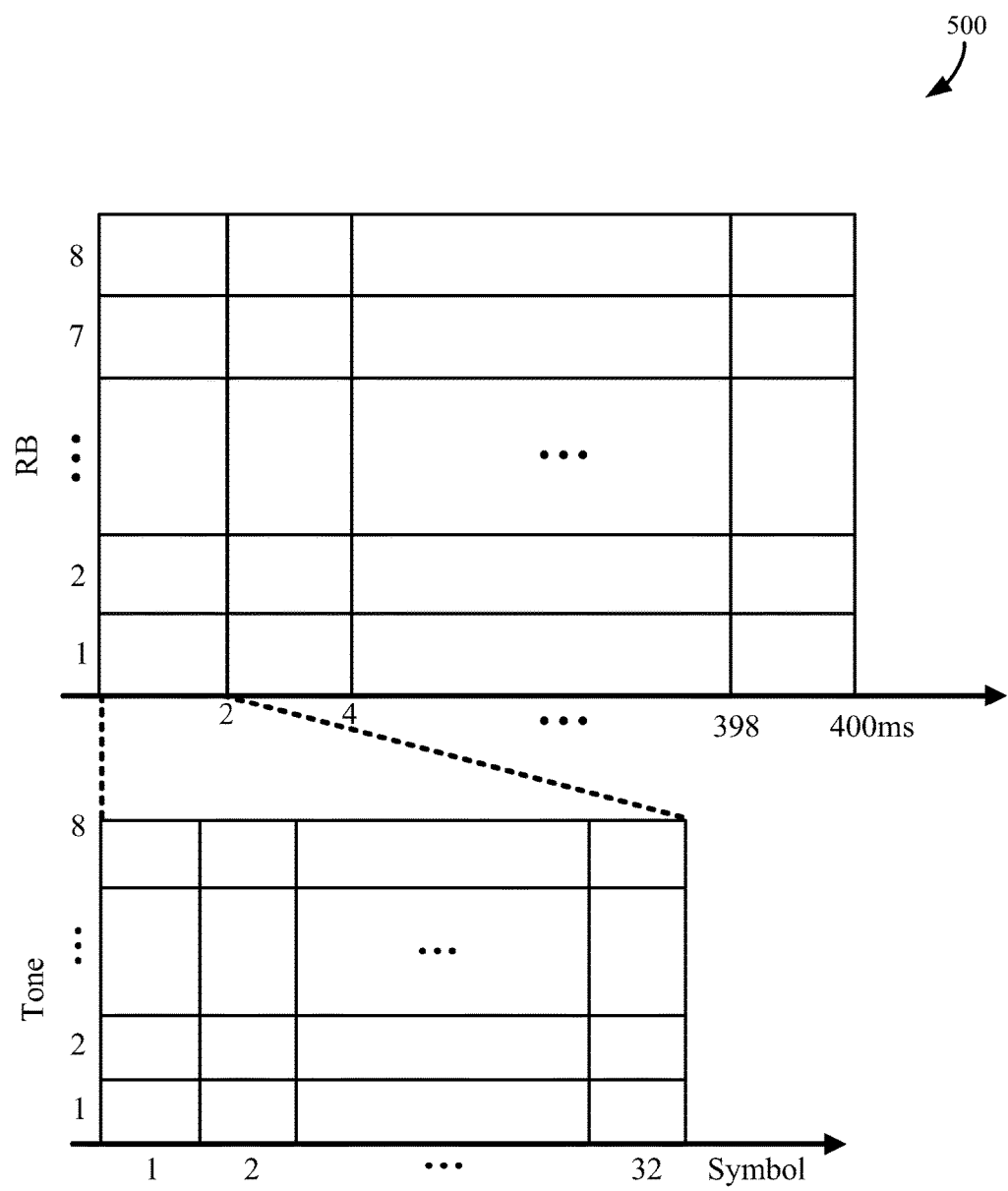
FIG. 5 is a diagram illustrating an example of various resource blocks (RBs) in accordance with some aspects of the present disclosure.

FIG. 5 is a diagram 500 illustrating an example of a discovery frame in accordance with some aspects of the present disclosure. Although some specific examples may be provided herein with reference to the discovery frame illustrated in FIG. 5, one of ordinary skill in the art will understand that such examples are provided for illustrative purposes and are not intended to necessarily limit the scope of the present disclosure. Additional or alternative examples of any details provided with reference to the discovery frame illustrated in FIG. 5 may exist without necessarily deviating from the scope of the present disclosure.

The non-limiting example of the discovery frame illustrated in FIG. 5 includes eight resource blocks (RBs) in each slot. The duration of each slot may be 2 milliseconds (ms) or 32 symbols. Each RB may have eight tones. The bandwidth of the communication channel may be 1.15 Megahertz (MHz). The subcarrier spacing may be approximately 18 Kilohertz (KHz). The cyclic prefix (CP) duration may be approximately 6.94 microseconds (μs). The OFDM symbol duration may be approximately 62.5 μs. The fast Fourier transform (FFT) size may be 64. The modulation and coding scheme (MCS) may be quadrature phase shift keying (QPSK) with a rate of ½. The number of relays in a two-hop neighborhood may be approximately 1,000, which may provide support for approximately $10^5$ devices, where approximately 10% may operate as relays. In this example, the discovery frame may have approximately 200 slots and duration of approximately 400 ms.

Figure 6:
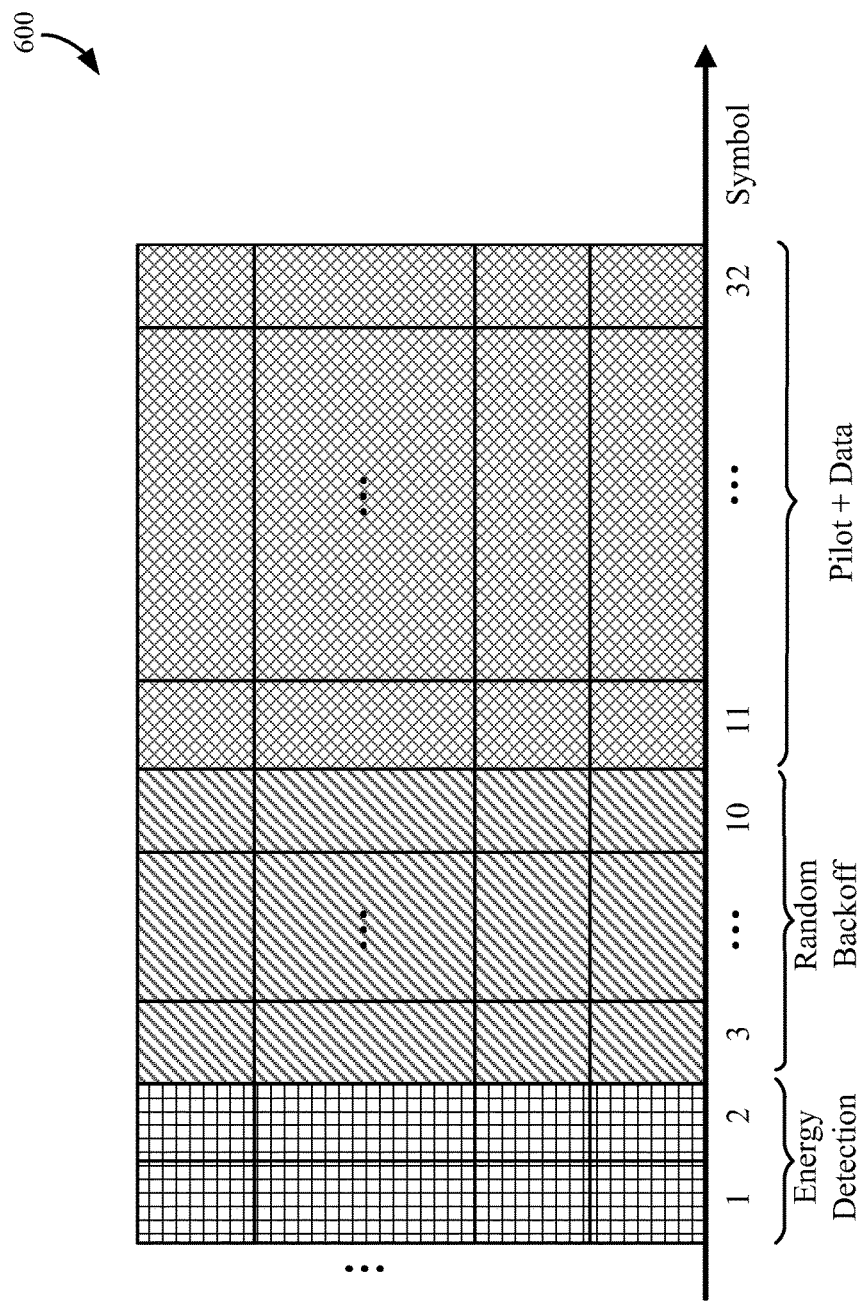
FIG. 6 is a diagram illustrating an example of a discovery frame in accordance with some aspects of the present disclosure.

FIG. 6 is a diagram 600 illustrating an example of a RB in a slot (e.g., 32 symbols) of a discovery frame according to some aspects of the present disclosure. A first portion of the slot (e.g., symbols 1-10) may be utilized for reservation and contention resolution. In the non-limiting example illustrated in FIG. 6, symbols 1-2 are utilized, generally, for reservation of discovery resources, and symbols 3-10 are utilized, generally, for contention resolution. During symbols 1-2, energy detection is performed. This portion of the slot (e.g., symbols 1-2) may sometimes be referred to as a new transmission time (e.g., new broadcast time (NBT)) and/or various other suitable terms without necessarily deviating from the scope of the present disclosure. For example, a UE may monitor (e.g., listen) during this portion of the slot (e.g., symbols 1-2) to determine whether energy above a threshold value is detected for a discovery resource. Generally, a discovery resource refers to a radio resource (e.g., a particular frequency range, communication channel, etc.) that may be utilized by one UE to discover the presence and/or capabilities of another UE.

One of ordinary skill in the art will appreciate that the aforementioned threshold (for energy detection) may vary among different implementations without necessarily deviating from the scope of the present disclosure. If energy above a threshold value is detected for the discovery resource, the UE may determine that the discovery resource is unavailable for communication (e.g., because it is being utilized by another UE) and thereafter refrain from using that discovery resource. On the other hand, if energy above a threshold value is undetected for the discovery resource, the UE may determine that that discovery resource is available for communication (e.g., because it is not being utilized by another UE).

A non-limiting example of such a communication is a discovery transmission. A 'discovery transmission' may refer to various forms of transmission without necessarily deviating from the scope of the present disclosure. The discovery transmission may be a synchronous transmission. In some examples, a discovery transmission may refer to a discovery broadcast (e.g., a synchronous discovery broadcast), a discovery multicast (e.g., a synchronous discovery multicast), and/or various other suitable forms of transmission. Although some non-limiting examples are provided herein with reference to a 'discovery broadcast,' one of ordinary skill in the art will understand that such a 'discovery broadcast' may alternatively be any of the aforementioned forms of transmission without necessarily deviating from the scope of the present disclosure.

A discovery broadcast may include pilot(s) and data, as indicated in FIG. 6. In some examples, the discovery broadcast may have a duration of 22 symbols (e.g., symbols 11-32). The data may also include various types of information, such as an address (e.g., a 64-bit address) of the UE, cyclic redundancy check (CRC) information (e.g., a 16-bit CRC), and various parameters. These parameters may relate to the sleep/awake state(s), such as the sleep/awake duty cycle, transmission offset, and/or other suitable information related to the sleep/awake state(s). These parameters may additionally or alternatively relate to energy, such as battery level, energy rate, marginal energy cost, and/or other suitable information related to energy. These parameters may additionally or alternatively relate to latency, such as number of hops to the base station (e.g., eNB), delay information, and/or other suitable information related to latency.

However, before communicating a discovery broadcast, the UE may initiate a random backoff timer. In the example illustrated in FIG. 6, the duration of the random backoff is eight symbols (e.g., symbols 3-10), but one of ordinary skill in the art will understand that this is a non-limiting example and various alternative durations may be implemented without deviating from the scope of the present disclosure. Until the expiration of the random backoff timer, the UE may refrain from utilizing the discovery resource and monitor (e.g., listen to) that discovery resource to determine whether energy above a threshold value is detected.

If energy above a threshold value is detected before expiration of the random backoff timer (e.g., during symbols 3-10), the UE may determine that the discovery resource is unavailable (e.g., because it is being utilized by another apparatus) and thereafter refrain from using the discovery resource to communicate a discovery broadcast. On the other hand, if energy above a threshold value is undetected before expiration of the random backoff timer (e.g., during symbols 3-10), the UE may determine that the discovery resource is available for communication (e.g., because it is not being utilized by another UE) and thereafter initiate communication of the discovery broadcast using the discovery resource.

Figure 7:
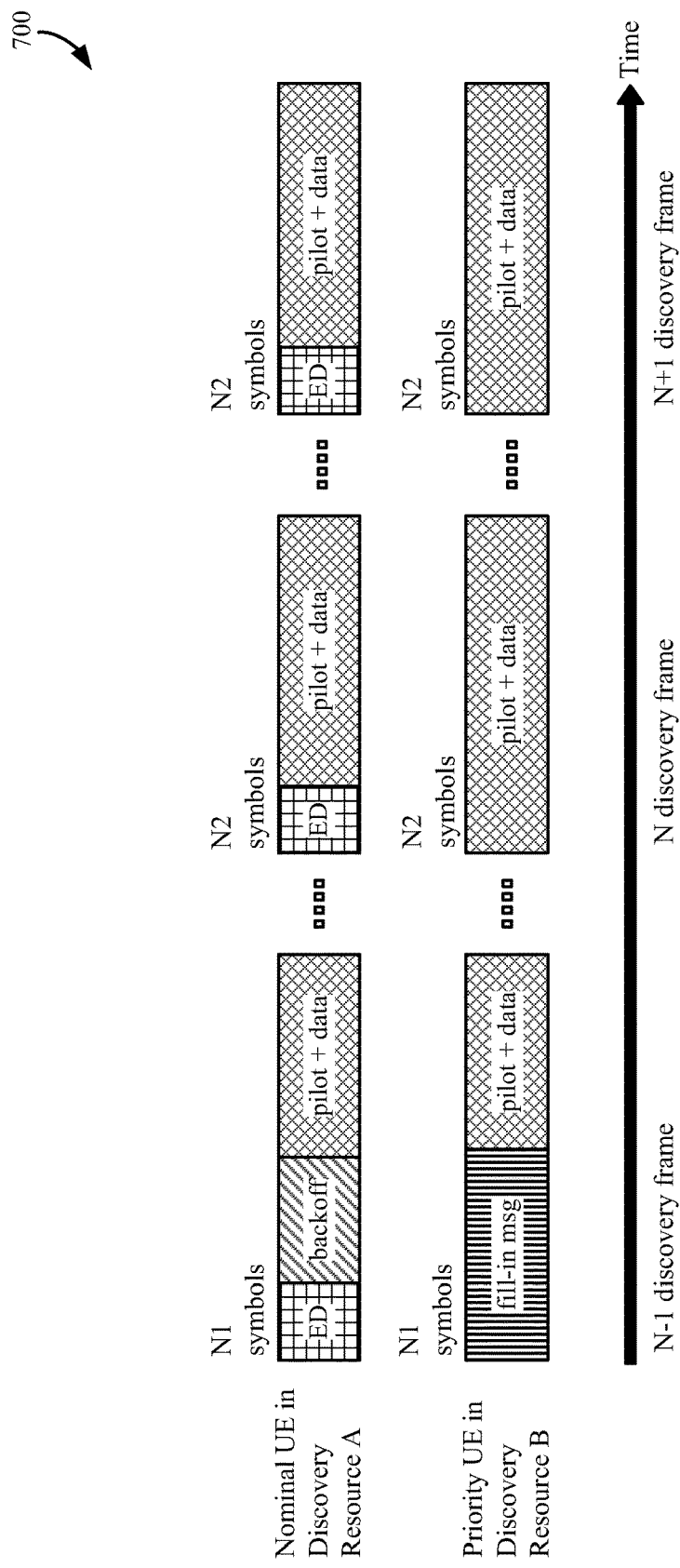
FIGS. 7-10 are diagrams illustrating examples of various discovery frames communicated by nominal and priority UEs in accordance with some aspects of the present disclosure.

FIG. 7 is a diagram 700 illustrating an example of various discovery frames transmitted by UEs communicating various types of traffic. In some circumstances, a UE may communicate nominal traffic. Generally, nominal traffic refers to traffic that is ordinary, regular, and/or normal. Non-limiting examples of nominal traffic include voice over Internet protocol (VoIP) traffic, cellular voice and/or text communications, video traffic, and/or other suitable types of traffic. In some other circumstances, a UE may communicate priority traffic. A non-limiting example of priority traffic is mission-critical traffic. Generally, mission-critical traffic refers to traffic that is urgent, vital, important, essential, and/or time-sensitive. In some examples, mission-critical traffic refers to ultra-low-latency traffic and/or ultra-high-reliability traffic. Accordingly, a reliability requirement of mission-critical traffic may be higher than a reliability requirement of nominal traffic, and/or a latency requirement of mission-critical traffic may be lower than a latency requirement of nominal traffic. Non-limiting examples of mission-critical traffic may include certain emergency information (e.g., emergency braking controls for a car), certain autonomous operations (e.g., autonomous automobiles, drone-type air vehicles), certain virtual surgeries, and many other suitable types of traffic. In the present disclosure, a UE communicating nominal traffic may be referred to as a 'nominal UE,' and a UE communicating priority traffic may be referred to as a 'priority UE.'

FIG. 7 illustrates various discovery frames communicated by a nominal UE utilizing one discovery resource (Discovery Resource A) and a priority UE utilizing another discovery resource (Discovery Resource B). Various aspects pertaining to the first discovery frame (e.g., N−1 discovery frame) communicated by the nominal UE are described in detail above with reference to FIG. 6. As described in greater detail above with reference to FIG. 6, an initial portion of the first discovery frame is utilized for energy detection (ED). In the example illustrated in FIG. 7, this initial portion includes a set of symbols referred to as the 'N1 symbols.' The initial portion (e.g., ED portion) of the first discovery frame (e.g., N−1 discovery frame) is followed by a random backoff portion as well as the pilot and data portion, which are described in greater detail above with reference to FIG. 6. In subsequent discovery frames (e.g., N discovery frame, N+1 discovery frame, etc.), an initial portion of the discovery frame may (again) be utilized for energy detection, although no random backoff portion exists because the nominal UE presumably reserved that discovery resource (e.g., Discovery Resource A) during a preceding discovery frame (e.g., N−1 discovery frame). In the example illustrated in FIG. 7, the initial portion utilized for energy detection in subsequent discovery frames (e.g., N discovery frame, N+1 discovery frame, etc.) includes a set of symbols referred to as the 'N2 symbols.'

Generally, the N2 symbols are fewer than or less than the N1 symbols. In other words, the duration of the N2 symbols is shorter than the duration of the N1 symbols. As such, the duration of time that a nominal UE spend detecting energy (e.g., from other UEs) is less during subsequent discovery frames (e.g., N discovery frame, N+1 discovery frame, etc.) relative to the duration of time that a nominal UE spends detecting energy (e.g., from other UEs) in the first discovery frame (e.g., N−1 discovery frame). This relationship (e.g., N1 symbols>N2 symbols) facilitates implicit prioritization between nominal UEs contending for the same discovery resource (e.g., Discovery Resource A), as explained in greater detail using the following example.

A first nominal UE may reserve Discovery Resource A during the N−1 discovery frame. Afterwards, during the N discovery frame, a second nominal UE may wish to (also) utilize Discovery Resource A. During the N discovery frame, the first nominal UE will perform energy detection for the duration of N2 symbols, and the second nominal UE will perform energy detection for a duration of N1 symbols. As mentioned above, the duration of the N1 symbols is greater than the duration of the N2 symbols. Accordingly, the first nominal UE will complete energy detection and begin to transmit the pilot and data signals while the second nominal UE is still performing energy detection. As such, the second nominal UE will detect energy on Discovery Resource A and, therefore, abandon Discovery Resource A. Because the duration of N1 symbols>the duration of N2 symbols, the first nominal UE implicitly gains priority to the discovery resource (e.g., Discovery Resource A) over the second nominal UE. Put another way, the second nominal UE yields to the first nominal UE.

The foregoing description explains some mechanisms for prioritizing between nominal UEs. However, as explained in greater detail above, priority UEs may sometimes communicate mission-critical traffic. As such, it may be beneficial for the priority UEs to have priority to the discovery resource over all nominal UEs. In some circumstances, synchronous transmissions may be performed without the aid of explicit feedback mechanisms that enable prioritized access to a discovery resource. Accordingly, the nominal UEs may not receive explicit notification prior to the synchronous transmission that a priority UE needs priority to a discovery resource. Non-limiting examples of such synchronous transmissions may include synchronous broadcast transmissions, synchronous multicast transmissions, and/or various other suitable forms of synchronous transmissions.

Accordingly, aspects of the present disclosure provide for altering a use of at least some of an initial portion of a discovery frame from energy detection to signal transmission. For example, referring to FIG. 7, the priority UE transmits signals (e.g., fill-in message(s)) during the initial portion of the discovery frame(s) (e.g., N−1, N, N+1 discovery frame(s)). Instead of using the initial portion of the discovery frame for energy detection (as described above with reference to the nominal UE), the priority UE uses the initial portion of the discovery frame for signal transmission. The signal transmission may include various types of transmission without necessarily deviating from the scope of the present disclosure. Non-limiting examples of such signal transmission include a pilot signal transmission, a non-information-carrying signal transmission, and/or various other suitable types of signal transmissions. The signal transmission may be at a power level that is sufficient to result in energy detection at another UE. Additional examples describing the features enabling a priority UE to have priority over a nominal UE for a discovery resource is provided below with reference to FIGS. 8-11.

Figure 8:
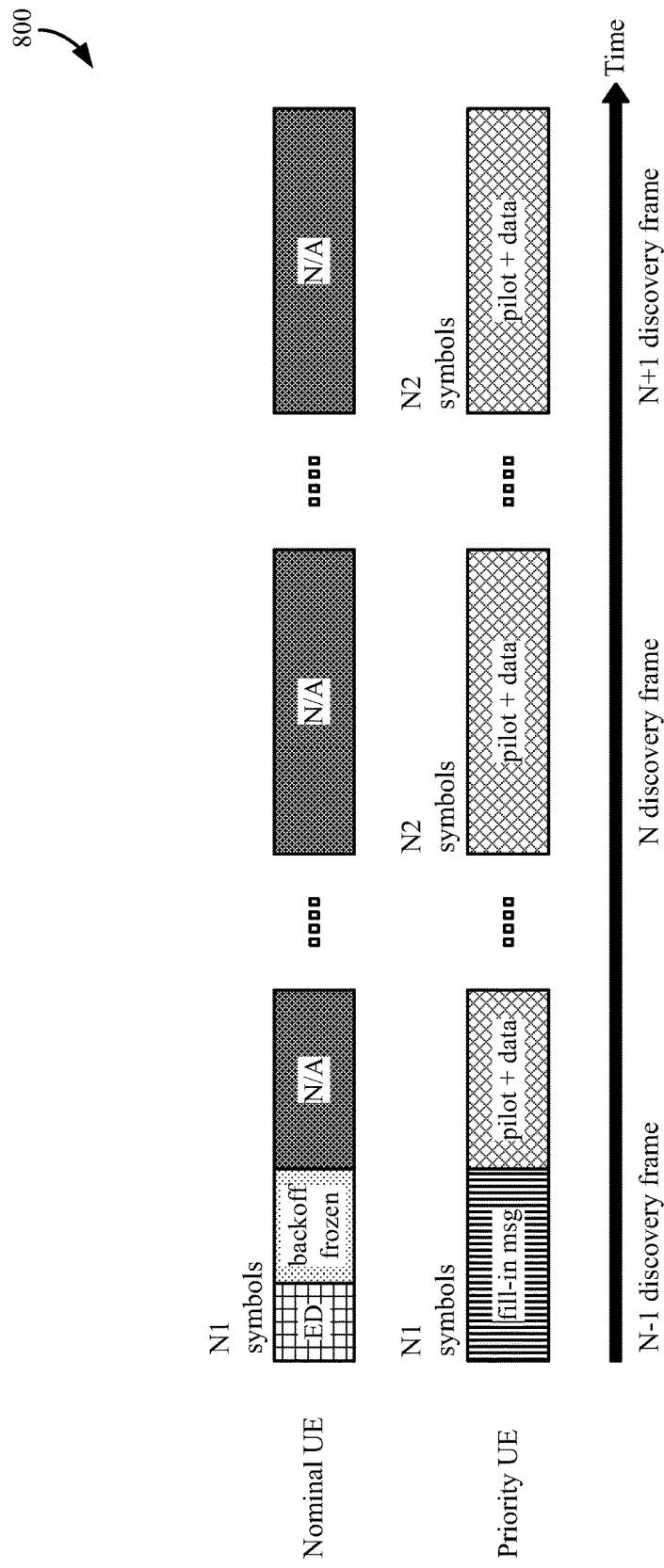

FIG. 8 is a diagram 800 illustrating an example of a nominal UE and a priority UE attempting to gain initial access to the same discovery resource. The nominal UE performs energy detection during the initial portion of the first discovery frame (e.g., N−1 discovery frame). In comparison, the priority UE does not perform energy detection during that portion of the first discovery frame (e.g., N−1 discovery frame). Instead, the priority UE performs signal transmission during that portion of the first discovery frame (e.g., N−1 discovery frame). Put another way, during at least a portion of the time that the nominal UE performs energy detection, the priority UE performs signal transmission. Accordingly, the nominal UE will likely detect the signal transmission of the priority UE and, therefore, abandon (e.g., refrain from using) that same discovery resource. Because the nominal UE detected energy during the ED portion of the first discovery frame (e.g., N−1 discovery frame), the nominal UE will freeze the backoff and not perform the pilot and data transmission, as illustrated in FIG. 8. By performing signal transmission during at least a portion of a discovery frame (e.g., N−1 discovery frame) for which energy detection was concurrently being performed by a nominal UE, the priority UE gains implicit priority to the discovery resource over the nominal UE and, therefore, may communicate mission-critical traffic in some examples. Put another way, by performing energy detection during at least a portion of a discovery frame (e.g., N−1 discovery frame) for which signal transmission is concurrently performed by a priority UE, the nominal UE effectively yields to the priority UE for access to the discovery resource.

Figure 9:
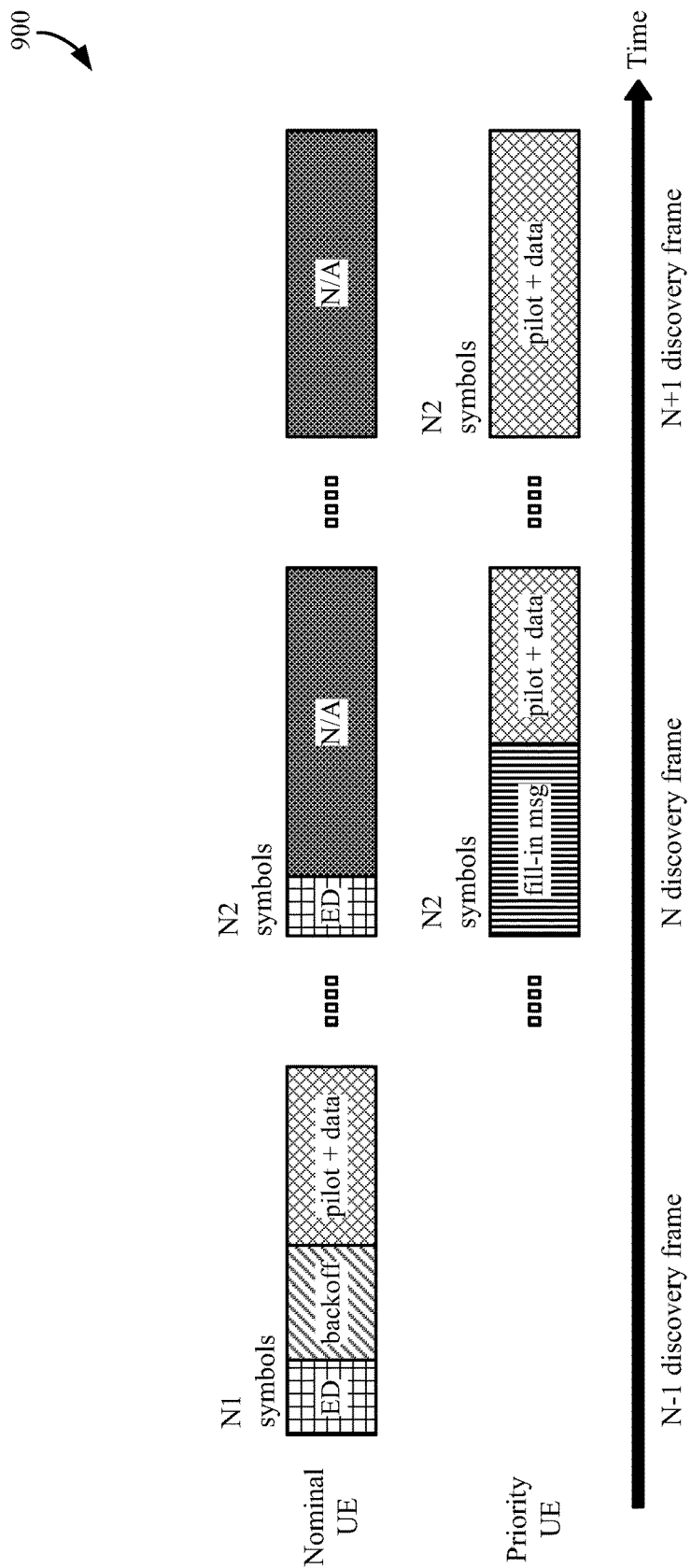

FIG. 9 is a diagram 900 illustrating an example of a priority UE attempting to gain access to a discovery resource that was previously accessed by a nominal UE. Unlike the example illustrated in FIG. 8, in the example illustrated in FIG. 9, the priority UE did not attempt to gain access to a discovery resource during a first discovery frame (e.g., N−1 discovery frame). However, the nominal UE did attempt to gain access to that discovery resource during a first discovery frame (e.g., N−1 discovery frame). Because the nominal UE did not detect energy during the ED portion and backoff portion of the first discovery frame (e.g., N−1 discovery frame), the nominal UE gained access to that discovery resource and subsequently transmitted pilot and data during the first discovery frame (e.g., N−1 discovery frame).

However, the priority UE attempts to gain access to the discovery resource during a subsequent discovery frame (e.g., N discovery frame). As described in greater detail above, a nominal UE performs energy detection at the initial portion of every discovery frame, even if the nominal UE gained access to a discovery resource during a preceding discovery frame (e.g., N−1 discovery frame). Therefore, as shown in FIG. 9, the nominal UE performs energy detection for the N2 symbols of the N discovery frame. As also described in greater detail above, a nominal UE performs signal transmission during the initial portion of the discovery frame. Thus, as shown in FIG. 9, the priority UE performs signal transmission (e.g., transmission of a fill-in message) during the initial portion of the N discovery frame.

The priority UE performs the signal transmission during a portion of time that at least partially overlaps with (e.g., is temporally concurrent with) a portion of time that the nominal UE is performing energy detection. Because the priority UE performs signal transmission during at least a portion of the time that the nominal UE performs energy detection, the nominal UE will likely detect the signal transmission of the priority UE and, therefore, abandon (e.g., refrain from using) the same discovery resource. Because the nominal UE detected energy during the ED portion of the discovery frame (e.g., N discovery frame), the nominal UE will not perform the pilot and data transmission, as shown in FIG. 9. By performing signal transmission during at least a portion of a discovery frame (e.g., N discovery frame) for which energy detection was concurrently being performed by a nominal UE, the priority UE gains implicit priority to the discovery resource over the nominal UE and, therefore, may communicate mission-critical traffic in some examples. Put another way, by performing energy detection during at least a portion of a discovery frame (e.g., N discovery frame) for which signal transmission is concurrently performed by a priority UE, the nominal UE effectively yields to the priority UE for access to the discovery resource.

Generally, aspects described herein with reference to FIGS. 7-9 describe how a priority UE gains priority to a discovery resource over a nominal UE. Put another way, aspects described herein with reference to FIGS. 7-9 describe how a nominal UE yields priority to a discovery resource to a priority UE. In those examples, no more than one priority UE attempts to gain access to the discovery frame during a single discovery frame. In some circumstances, however, multiple priority UEs (e.g., a plurality of priority UEs) may attempt to gain access to a discovery resource during the same discovery frame.

Figure 10:
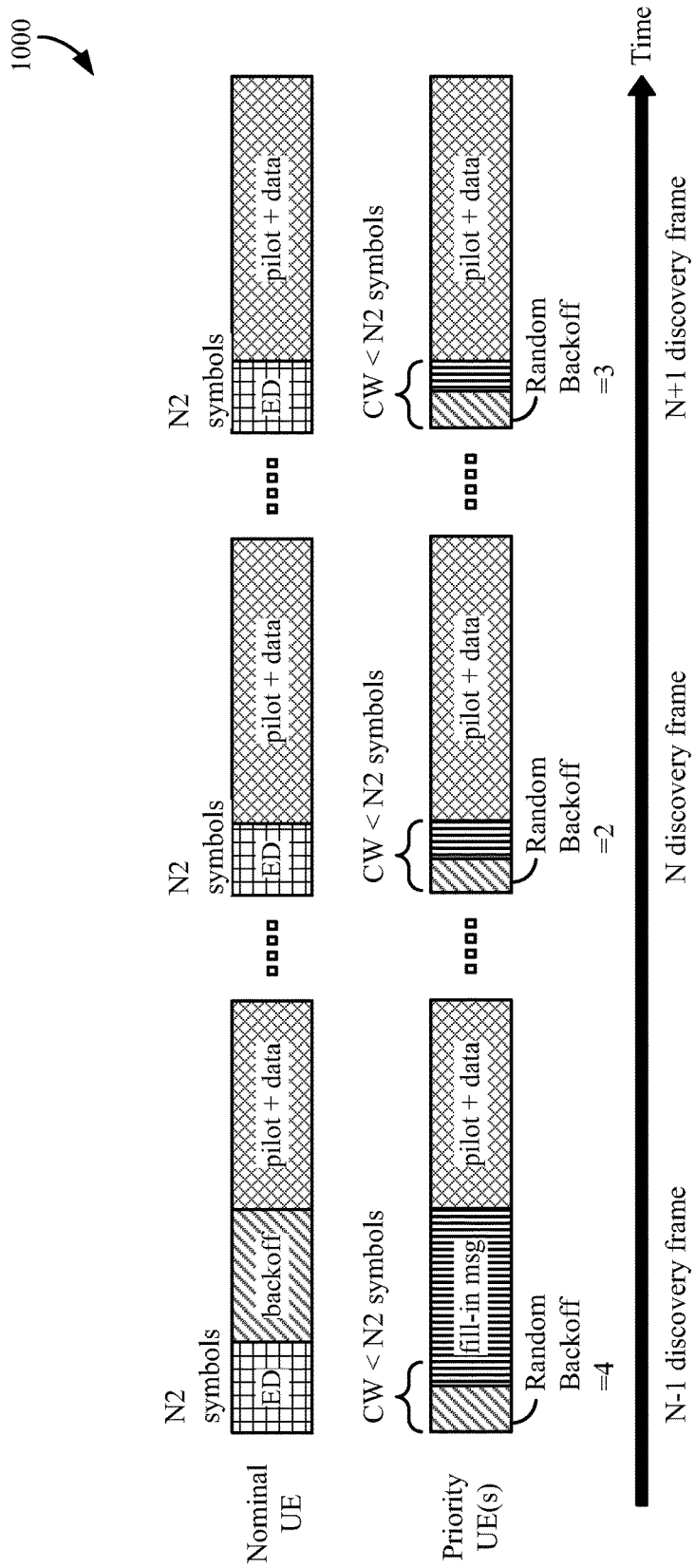

FIG. 10 is diagram 1000 illustrating an example of various priority UEs attempting to gain access to discovery resource. This example may demonstrate how resource access may be prioritized between multiple priority UEs. As shown in FIG. 10, the priority UEs may implement a contention window (CW). The contention window may include a random backoff portion. The duration of the random backoff portion is randomly selected from a preselected set of values, the maximum of which cannot be equal to or greater than the duration of the N2 symbols. In other words, the duration of the contention window is less than the duration of the N2 symbols in some examples.

The remaining portion of the contention window (e.g., [contention window]−[random backoff duration]) may be utilized for signal transmission, as illustrated in FIG. 10. Accordingly, [N1 symbols]>[N2 symbols]>[contention window]>[random backoff]. By (i) including at least some signal transmission (e.g., fill-in message) during at least some portion of the contention window and (ii) keeping the duration of the contention window to be less than the duration of the N2 symbols, all priority UEs will have priority to discovery resources over all nominal UEs (because nominal UEs will detect the energy of the signal transmission (e.g., fill-in message) during their N2 (or N1) symbols).

Generally, a first priority UE that has a random backoff duration that is less than a random backoff duration of a second priority UE will have priority over that second priority UE for access to the discovery resource. The reason for this general relationship is because the first priority UE having the relatively shorter random backoff duration will not detect energy (e.g., above a threshold value) during its relatively shorter random backoff duration (which overlaps with the random backoff duration of the second priority UE) and will thereafter begin signal transmission (e.g., fill-in message) promptly at the conclusion of its relatively shorter random backoff duration. The second priority UE has a relatively longer random backoff duration and, therefore, will detect that signal transmission during its random backoff duration. In these configurations, the signal transmission (e.g., fill-in message) by the first priority UE having a relatively shorter random backoff duration will overlap with the energy detection performed during the relatively longer random backoff duration of the second priority UE.

Therefore, a priority UE that has a relatively longer random backoff duration will abandon the discovery resource, thereby effectively yielding that discovery resource to a priority UE that has a relatively shorter random backoff duration. Put another way, a priority UE that has a relatively shorter random backoff duration will gain access to the discovery resource instead of a priority UE having a relatively shorter random backoff duration, thereby effectively gaining priority access to that discovery resource over the priority UE that has the relatively longer random backoff duration. Applying this relationship to the example, illustrated in FIG. 10, one of ordinary skill in the art will appreciate that a priority UE having a random backoff duration of two symbols (e.g., as shown in N discovery frame) will have priority to the discovery resource over a priority UE having a random backoff duration of three symbols (e.g., as shown in N+1 discovery frame), which will have priority to the discovery resource over a priority UE having a random backoff duration of four symbols (e.g., as shown in N−1 discovery frame).

One of ordinary skill in the art will understand that any reference herein to a 'duration' of any symbol, window, and/or frame described herein may also be referring to the 'size,' 'length,' 'number,' and/or any other suitable terminology relating to such symbol, window, and/or frame, and vice versa, without necessarily deviating from the scope of the present disclosure.

Figure 11:
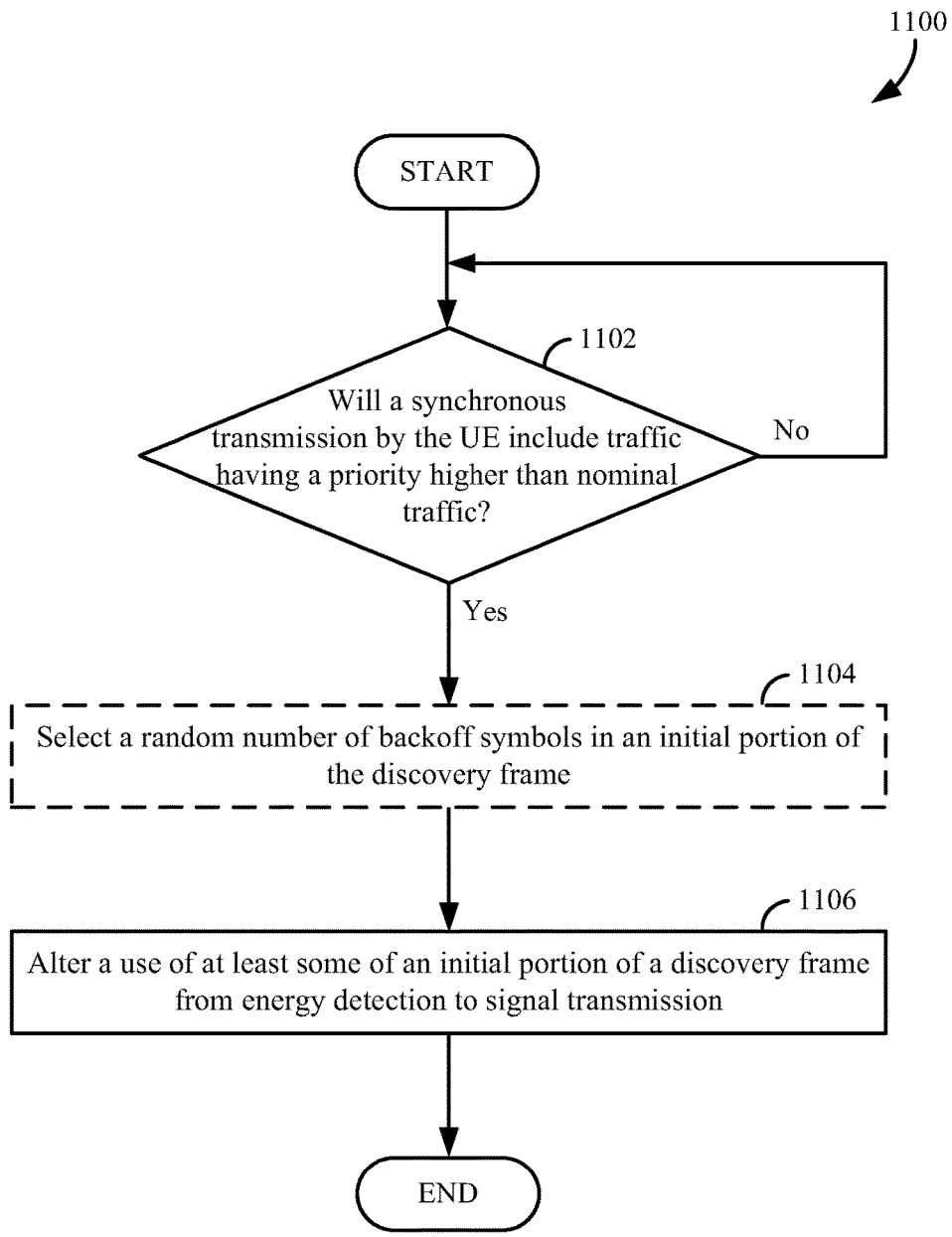
FIG. 11 is a diagram illustrating examples of various methods and/or processes according to some aspects of the present disclosure.

FIG. 11 is a diagram 1100 illustrating an example of various methods and/or processes according to some aspects of the present disclosure. In some configurations, such methods and/or processes may be performed and/or implemented in the subordinate entity 204 and/or any one or more of the various UEs described in greater detail herein. Although the description provided below with reference to FIG. 11 makes reference to a UE, one of ordinary skill in the art will understand that such methods and/or processes may be performed and/or implemented in various apparatuses without necessarily deviating from the scope of the present disclosure.

At block 1102, the UE may determine whether a synchronous transmission (e.g., synchronous broadcast transmission, synchronous multicast transmission, etc.) by the UE includes traffic having a priority higher than a priority of nominal traffic. For example, the UE may determine whether its synchronous transmission includes mission-critical traffic, which is described in greater detail above. If the UE does not have such high-priority traffic, the UE may be characterized as a 'nominal UE.' However, if the UE does have such high-priority traffic, the UE may be characterized as a 'priority UE,' and the methods and/or processes may proceed to block 1104 and/or block 1106.

In circumstances where multiple priority UEs are attempting to gain access to a discovery resource during the same discovery frame, the methods and/or processes may proceed to block 1104. (Put another way, if no more than one priority UE is attempting to access the discovery resource during a particular discovery window, the methods and/or processes may bypass block 1104 and proceed to block 1106.) At block 1104, the UE may select a random number of backoff symbols in an initial portion of the discovery frame. For example, referring to FIG. 10, the UE may determine a value for a random backoff portion of the discovery frame (e.g., a value of four in N−1 discovery frame, a value of two in N discovery frame, a value of three in N+1 discovery frame, etc.). As described in greater detail above, the duration of the random number of backoff symbols is smaller than the contention window, which is smaller than the duration of the N2 symbols.

At block 1106, the UE may alter a use of at least some of an initial portion (e.g., N1 symbols or N2 symbols) of a discovery frame from energy detection to signal transmission. In circumstances where multiple priority UEs are attempting to gain access to a discovery resource during the same discovery frame (e.g., block 1104 applies), the UE alters the use of at least the first symbol that follows the random number of backoff symbols in the initial portion (e.g., N1 symbols or N2 symbols) of the discovery frame from energy detection to signal transmission. For example, referring to FIG. 10, the priority UE alters the use of at least one of the symbols following the random backoff duration that overlaps (e.g., is concurrent) with at least one of the symbols used for energy detection by the nominal UE. By altering the use of such symbol(s) from energy detection (as is performed by the nominal UE during such symbol(s)) to signal transmission (e.g., transmission of fill-in message), the UE gains implicit priority over another UE (e.g., having nominal, non-high-priority traffic) for access to the discovery resource during that discovery frame.

On the other hand, in circumstances where no more than one priority UE is attempting to gain access to the discovery resource (e.g., block 1104 does not apply), the UE may not need to consider the random backoff portion mentioned above. In circumstances where no more than one priority UE is attempting to gain access to the discovery resource, the UE may alter a use of at least the first symbol of the initial portion (e.g., N1 symbols or N2 symbols) of the discovery frame. For example, referring to FIG. 8, the priority UE performs signal transmission (e.g., transmission of the fill-in message) starting at the very first symbol of the discovery frame. In other words, (at least) the first symbol (of the set of symbols referred to as the N1 symbols) is utilized for signal transmission by the priority UE, whereas (at least) the first symbol (of the set of symbols referred to as the N1 symbols) is utilized for energy detection by the nominal UE. By altering the use of such symbol(s) from energy detection (as is performed by the nominal UE during such symbol(s)) to signal transmission (e.g., transmission of fill-in message), the UE gains implicit priority over another UE (e.g., having nominal, non-high-priority traffic) to access the discovery resource during that discovery frame.

Several aspects of a wireless communication network have been presented with reference to an exemplary implementation. As those skilled in the art will readily appreciate, various aspects described throughout this disclosure may be extended to other telecommunication systems, network architectures and communication standards. By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication by a user equipment (UE), the method comprising:
providing a discovery frame structure comprising an energy detection portion and a discovery transmission portion, wherein the energy detection portion comprises a first set of symbols for an initial discovery frame and a second set of symbols for a subsequent discovery frame, the second set of symbols comprising a fewer number of symbols than the first set of symbols;
determining that a synchronous transmission to be transmitted by the UE includes traffic having a priority higher than a priority of nominal traffic;
in response to the determination, altering a use of at least some of the energy detection portion of a current discovery frame from energy detection to signal transmission such that the UE performs the signal transmission within at least a portion of the second set of symbols within the energy detection portion of the current discovery frame; and
transmitting the synchronous transmission during the discovery transmission portion of the current discovery frame.

2. The method of claim 1, wherein the signal transmission comprises at least one of:
a pilot signal transmission; or
a non-information-carrying signal transmission.

3. The method of claim 1, wherein the traffic having the priority higher than the nominal traffic comprises:
mission-critical traffic, wherein a reliability requirement of the mission-critical traffic is higher than a reliability requirement of the nominal traffic, and wherein a latency requirement of the mission-critical traffic is lower than a latency requirement of the nominal traffic.

4. The method of claim 1, wherein the signal transmission comprises a power level sufficient to result in energy detection at another UE.

5. The method of claim 1, wherein the altering use of at least some of the energy detection portion of a current discovery frame from energy detection to signal transmission comprises:
altering a use of at least a first symbol of the energy detection portion of the current discovery frame from energy detection to signal transmission.

6. The method of claim 1, further comprising:
selecting a random number of backoff symbols in the energy detection portion of the current discovery frame,
wherein the altering the use of at least some of the energy detection portion of a current discovery frame from energy detection to signal transmission comprises:
altering a use of at least a first symbol that follows the random number of backoff symbols in the energy detection portion of the current discovery frame from energy detection to signal transmission.

7. The method of claim 6, wherein the random number of backoff symbols is fewer than a number of symbols in the second set of symbols.

8. The method of claim 1, wherein the synchronous transmission comprises at least one of a synchronous broadcast transmission or a synchronous multicast transmission.

9. An apparatus for wireless communication, the apparatus comprising:
a processor;
a transceiver communicatively coupled to the at least one processor; and
a memory communicatively coupled to the at least one processor and storing subframe information providing a discovery frame structure comprising an energy detection portion and a discovery transmission portion, wherein the energy detection portion comprises a first set of symbols for an initial discovery frame and a second set of symbols for a subsequent discovery frame, the second set of symbols comprising a fewer number of symbols than the first set of symbols;
wherein the processor is configured to:
determine that a synchronous transmission to be transmitted by the apparatus includes traffic having a priority higher than a priority of nominal traffic;
in response to the determination, alter a use of at least some of the energy detection portion of a current discovery frame from energy detection to signal transmission such that the UE performs the signal transmission within at least a portion of the second set of symbols within the energy detection portion of the current discovery frame; and
transmit the synchronous transmission during the discovery transmission portion of the current discovery frame.

10. The apparatus of claim 9, wherein the signal transmission comprises at least one of:
a pilot signal transmission; or
a non-information-carrying signal transmission.

11. The apparatus of claim 9, wherein the traffic having the priority higher than the nominal traffic comprises:
mission-critical traffic, wherein a reliability requirement of the mission-critical traffic is higher than a reliability requirement of the nominal traffic, and wherein a latency requirement of the mission-critical traffic is lower than a latency requirement of the nominal traffic.

12. The apparatus of claim 9, wherein the signal transmission comprises a power level sufficient to result in energy detection at another apparatus.

13. The apparatus of claim 9, wherein the altering the use of at least some of the energy detection portion of a current discovery frame from energy detection to signal transmission comprises:

altering a use of at least a first symbol of the energy detection portion of the current discovery frame from energy detection to signal transmission.

14. The apparatus of claim 9, wherein the processor is further configured to:
   select a random number of backoff symbols in the energy detection portion of the current discovery frame,
   wherein the altering the use of at least some of the energy detection portion of a current discovery frame from energy detection to signal transmission comprises:
      altering a use of at least a first symbol that follows the random number of backoff symbols in the energy detection portion of the current discovery frame from energy detection to signal transmission.

15. The apparatus of claim 14, wherein the random number of backoff symbols is fewer than a number of symbols in the second set of symbols.

16. A non-transitory computer-readable medium storing computer-executable code comprising instructions configured to:
   provide a discovery frame structure comprising an energy detection portion and a discovery transmission portion, wherein the energy detection portion comprises a first set of symbols for an initial discovery frame and a second set of symbols for a subsequent discovery frame, the second set of symbols comprising a fewer number of symbols than the first set of symbols;
   determine that a synchronous transmission to be transmitted includes traffic having a priority higher than a priority of nominal traffic;
   in response to the determination, alter a use of at least some of the energy detection portion of a current discovery frame from energy detection to signal transmission such that the UE performs the signal transmission within at least a portion of the second set of symbols within the energy detection portion of the current discovery frame; and
   transmit the synchronous transmission during the discovery transmission portion of the current discovery frame.

17. The non-transitory computer-readable medium of claim 16, wherein the signal transmission comprises at least one of:
   a pilot signal transmission; or
   a non-information-carrying signal transmission.

18. The non-transitory computer-readable medium of claim 16, wherein the traffic having the priority higher than the nominal traffic comprises:
   mission-critical traffic, wherein a reliability requirement of the mission-critical traffic is higher than a reliability requirement of the nominal traffic, and wherein a latency requirement of the mission-critical traffic is lower than a latency requirement of the nominal traffic.

19. The non-transitory computer-readable medium of claim 16, wherein the signal transmission comprises a power level sufficient to result in energy detection at an apparatus.

20. The non-transitory computer-readable medium of claim 16, wherein the altering the use of at least some of the energy detection portion of a current discovery frame from energy detection to signal transmission comprises:
   altering a use of at least a first symbol of the energy detection portion of the current discovery frame from energy detection to signal transmission.

21. The non-transitory computer-readable medium of claim 16, wherein the instructions are further configured to:
   select a random number of backoff symbols in the energy detection portion of the current discovery frame,
   wherein the altering the use of at least some of the energy detection portion of a current discovery frame from energy detection to signal transmission comprises:
      altering a use of at least a first symbol that follows the random number of backoff symbols in the energy detection portion of the current discovery frame from energy detection to signal transmission.

22. The non-transitory computer-readable medium of claim 21, wherein the random number of backoff symbols is fewer than a number of symbols in the second set of symbols.

23. The non-transitory computer-readable medium of claim 16, wherein the synchronous transmission comprises at least one of a synchronous broadcast transmission or a synchronous multicast transmission.

24. An apparatus configured for wireless communication, the apparatus comprising:
   means for providing a discovery frame structure comprising an energy detection portion and a discovery transmission portion, wherein the energy detection portion comprises a first set of symbols for an initial discovery frame and a second set of symbols for a subsequent discovery frame, the second set of symbols comprising a fewer number of symbols than the first set of symbols;
   means for determining that a synchronous transmission to be transmitted by the UE includes traffic having a priority higher than a priority of nominal traffic;
   means for altering, in response to the determination, a use of at least some of the energy detection portion of a current discovery frame from energy detection to signal transmission such that the UE performs the signal transmission within at least a portion of the second set of symbols within the energy detection portion of the current discovery frame; and
   means for transmitting the synchronous transmission during the discovery transmission portion of the current discovery frame.

25. The apparatus of claim 24, wherein the signal transmission comprises at least one of:
   a pilot signal transmission; or
   a non-information-carrying signal transmission.

26. The apparatus of claim 24, wherein the traffic having the priority higher than the nominal traffic comprises:
   mission-critical traffic, wherein a reliability requirement of the mission-critical traffic is higher than a reliability requirement of the nominal traffic, and wherein a latency requirement of the mission-critical traffic is lower than a latency requirement of the nominal traffic.

27. The apparatus of claim 24, wherein the signal transmission comprises a power level sufficient to result in energy detection at another apparatus.

28. The apparatus of claim 24, wherein the altering the use of at least some of the energy detection portion of a current discovery frame from energy detection to signal transmission comprises:
   altering a use of at least a first symbol of the energy detection portion of the current discovery frame from energy detection to signal transmission.

29. The apparatus of claim 24, further comprising:
   means for selecting a random number of backoff symbols in the energy detection portion of the current discovery frame,
   wherein the means for altering the use of at least some of the energy detection portion of a current discovery frame from energy detection to signal transmission is configured to:

alter a use of at least a first symbol that follows the random number of backoff symbols in the energy detection portion of the discovery frame from energy detection to signal transmission.

30. The apparatus of claim 29, wherein the random number of backoff symbols is fewer than a number of symbols in the second set of symbols.

* * * * *